United States Patent [19]

Borray et al.

[11] Patent Number: 5,727,903

[45] Date of Patent: Mar. 17, 1998

[54] PROCESS AND APPARATUS FOR PURIFICATION AND COMPRESSION OF RAW LANDFILL GAS FOR VEHICLE FUEL

[75] Inventors: Edward Borray, Los Angeles; Geoff Smith, Olivehain, both of Calif.; Gordon Deane, Cohaset, Mass.

[73] Assignees: Genesis Energy Systems, Inc., Los Angeles, Calif.; Palmer Management Corporation, Cohasset, Mass.; a part interest

[21] Appl. No.: 623,229

[22] Filed: Mar. 28, 1996

[51] Int. Cl.⁶ ........................................... B01D 53/00
[52] U.S. Cl. ........................................... 405/129; 95/50
[58] Field of Search ........................... 405/128, 129; 95/50

[56] References Cited

U.S. PATENT DOCUMENTS

| | | |
|---|---|---|
| 3,589,313 | 6/1971 | Smith et al. . |
| 4,026,355 | 5/1977 | Johnson et al. ............... 405/129 X |
| 4,171,017 | 10/1979 | Klass . |
| 4,323,367 | 4/1982 | Ghosh . |
| 4,370,150 | 1/1983 | Fenstermaker . |
| 4,469,176 | 9/1984 | Zison . |
| 4,479,546 | 10/1984 | Bresie et al. . |
| 4,518,399 | 5/1985 | Croskell et al. . |
| 4,643,111 | 2/1987 | Jones . |
| 4,670,148 | 6/1987 | Schneider . |
| 4,681,612 | 7/1987 | O'Brien et al. . |
| 4,730,672 | 3/1988 | Payne . |
| 4,838,733 | 6/1989 | Katz . |
| 4,842,718 | 6/1989 | Luteijn et al. ............... 95/50 X |
| 4,857,078 | 8/1989 | Watler ........................... 95/50 |
| 5,104,425 | 4/1992 | Rao et al. ..................... 95/50 X |
| 5,139,365 | 8/1992 | Chesner ........................ 405/129 |
| 5,273,572 | 12/1993 | Baker et al. .................. 95/50 X |
| 5,288,170 | 2/1994 | Cummings . |
| 5,414,190 | 5/1995 | Forg et al. .................... 95/50 X |
| 5,451,249 | 9/1995 | Spiegel et al. ................ 95/117 |
| 5,507,856 | 4/1996 | Rao et al. ..................... 95/50 |

*Primary Examiner*—Tamara L. Graysay
*Assistant Examiner*—Frederick L. Lagman
*Attorney, Agent, or Firm*—Thomas I. Rozsa; Tony D. Chen

[57] ABSTRACT

A process and apparatus for purification and compression of raw landfill gas stream in a landfill to produce vehicle grade fuel. After the landfill gas stream is extracted and collected, all solids and significant moisture are removed in a pretreatment system prior to compression of the gas stream. The gas stream is then compressed to enhance the function of a membrane purification system. Additional moisture and compressor oil are removed. The gas stream is then heated to maintain any remaining moisture in vapor form. Volatile organic compounds and the balance of the compressor oil are removed from the gas stream by passing the gas stream across an activated carbon guard bed system. The resultant gas stream is fed to a multi-stage membrane system which separates the methane from the other constituents of the landfill gas stream including any remaining moisture. The resultant vehicle quality gas is then compressed to pressures acceptable for introduction and storage in motor vehicles converted to operate on compressed natural gas.

13 Claims, 2 Drawing Sheets

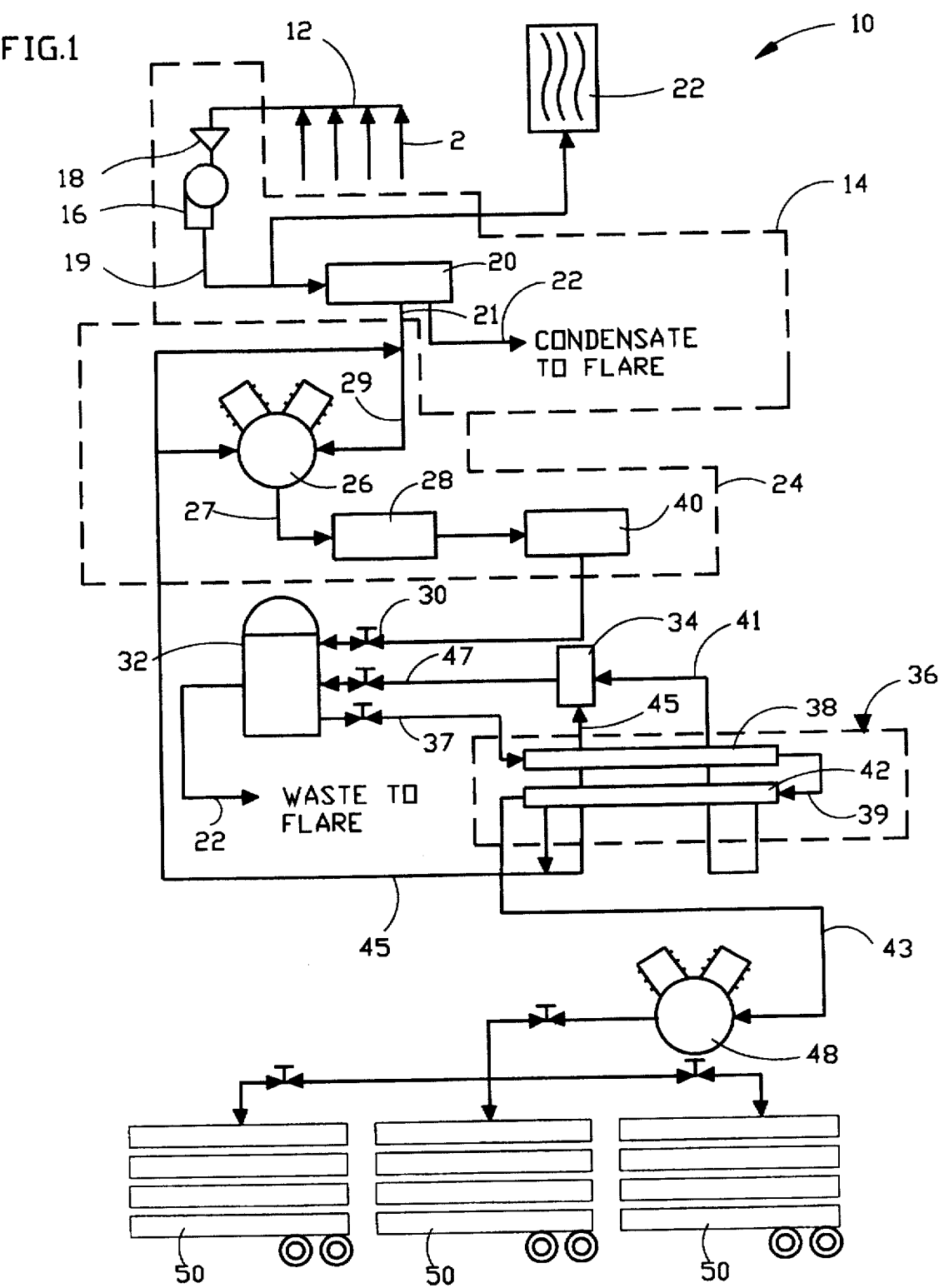

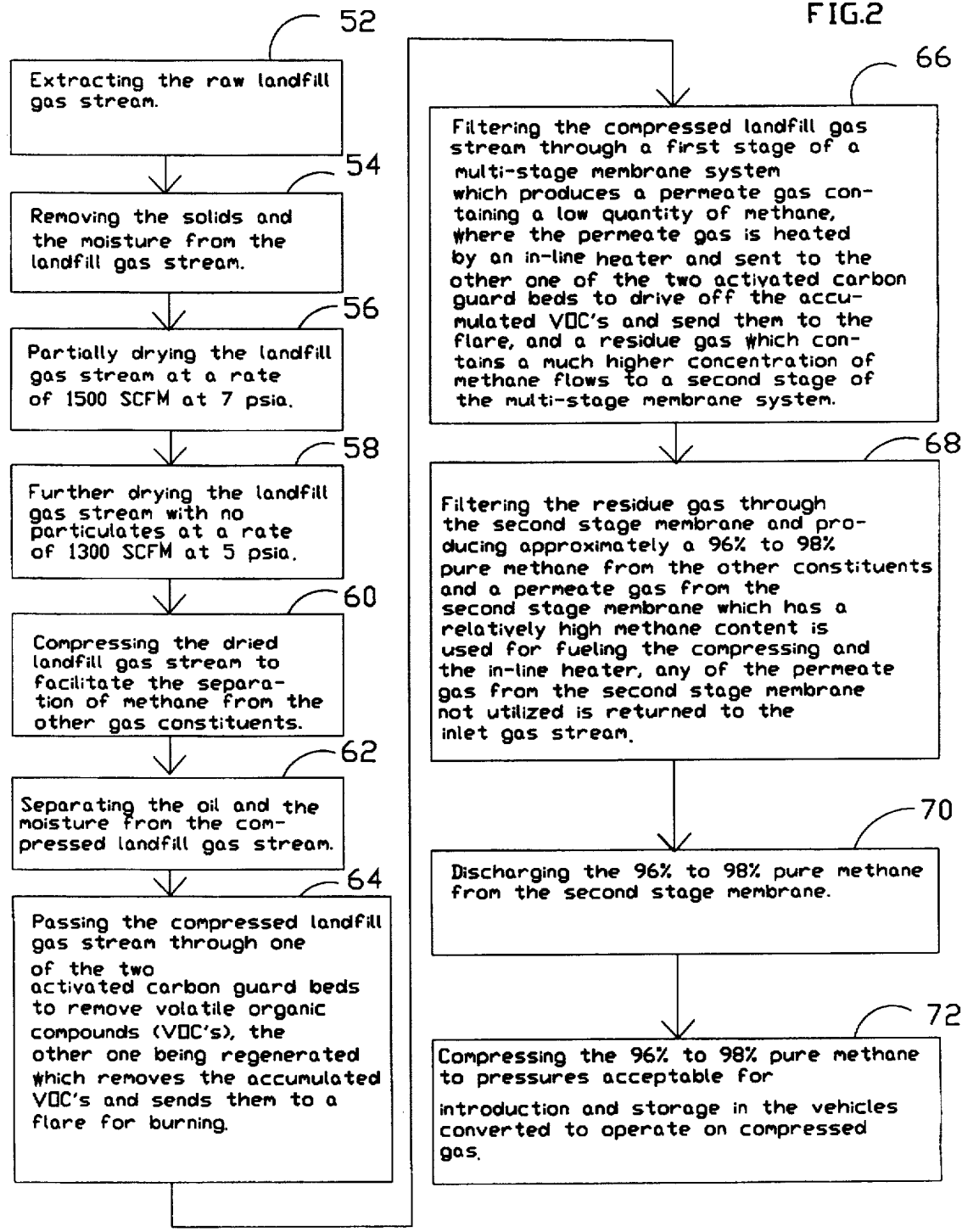

PROCESS AND APPARATUS FOR PURIFICATION AND COMPRESSION OF RAW LANDFILL GAS FOR VEHICLE FUEL

BACKGROUND OF THE INVENTION

1. Field of the Invention

The present invention generally relates to the field of treatment of landfills. More particularly, the present invention relates to a process and apparatus for purification and compression of raw landfill gas to produce vehicle fuel.

2. Description of the Prior Art

Presently, current wells which collect gas from landfills are shallow (averaging 30 feet deep). Because the current spacing of wells is excessive, the blower system which sucks the gas from the wells pulls very hard to avoid surface emissions of gas between the wells. Since many landfills are not capped, this excessive pulling by the blower system draws air into the wells and the gas stream rendering it unusable for Biomass Compressed Natural Gas (BCNG).

The following thirteen (13) prior art patents were uncovered in the pertinent field of the present invention:

1. U.S. Pat. No. 3,589,313 issued to Smith et al. on Jun. 29, 1971 for "Solid Waste Disposal Method And Apparatus" (hereafter "the Smith Patent");
2. U.S. Pat. No. 4,171,017 issued to Klass on Oct. 16, 1979 for "Method Of Gas Production From Geopressurized Geothermal Brines" (hereafter "the Klass Patent");
3. U.S. Pat. No. 4,323,367 issued to Ghosh on Apr. 6, 1982 for "Gas Production By Accelerated In Situ Bioleaching Of Landfills" (hereafter "the Ghosh Patent");
4. U.S. Pat. No. 4,370,150 issued to Fenstermaker on Jan. 25, 1983 for "Engine Performance Operating On Field Gas As Engine Fuel" (hereafter "the Fenstermaker Patent");
5. U.S. Pat. No. 4,469,176 issued to Zison et al. on Sep. 4, 1984 for "Landfill Gas Recovery System And Method With Pressure Symmetry" (hereafter "the Zison Patent");
6. U.S. Pat. No. 4,479,546 issued to Bresie et al. on Oct. 30, 1984 for "Method And Apparatus For Producing Natural Gas From Tight Formations" (hereafter "the Bresie Patent");
7. U.S. Pat. No. 4,518,399 issued to Croskell et al. on May 21, 1985 for "Process For Recovering Gases From Landfills" (hereafter "the Croskell Patent");
8. U.S. Pat. No. 4,643,111 issued to Jones on Feb. 17, 1987 for "Resource Recovery Utility" (hereafter "the Jones Patent");
9. U.S. Pat. No. 4,670,148 issued to Schneider on Jun. 2, 1987 for "Apparatus And Method For Withdrawing Gaseous Decomposition Products From A Refuse Dump" (hereafter "the Schneider Patent");
10. U.S. Pat. No. 4,681,612 issued to O'Brien et al. on Jul. 21, 1987 for "Process For The Separation Of Landfill Gas" (hereafter "the O'Brien Patent");
11. U.S. Pat. No. 4,730,672 issued to Payne on Mar. 15, 1988 for "Method Of Removing And Controlling Volatile Contaminants From The Vadose Layer Of Contaminated Earth" (hereafter "the Payne Patent");
12. U.S. Pat. No. 4,838,733 issued to Katz on Jun. 13, 1989 for "Landfill Compaction" (hereafter "the Katz Patent"); and
13. U.S. Pat. No. 5,288,170 issued to Cummings on Feb. 22, 1994 for "Sludge/Waste Landfill Method And System" (hereafter "the Cummings Patent").

The Smith Patent discloses a solid waste disposal system. It comprises a waste receiving and storage assembly, a shredding assembly, a drying assembly, a compressor-turbine assembly for compressing air for combustion of waste and for receiving hot gases produced in the combustion process, a combustion chamber assembly, and an electric generator assembly. The malodorous air from the waste storage, shredding and drying is compressed and used for combustion and the part of the hot exhaust gases from the turbine are used in the dryer.

The Klass Patent discloses a method of gas production from geopressurized geothermal brines. Methane and other similar fuel components are separated from the brine found in geopressurized geothermal zones, and permit these fuel components to permeate through the membranes while rejecting the brine.

The Ghosh Patent discloses a process for improved gas production and accelerated stabilization of landfills by accelerated in situ bioleaching of organic wastes by acid forming bacteria in substantially sealed landfills. The bioleachate and the deactivated acid forming bacteria are passed from the landfill to an acid phase digester to regenerate the activated culture of hydrolytic and liquefying anaerobic microorganisms for recirculation to the landfill. The supernatant from the acid phase digester is passed to a methane phase digester operated under conditions to produce methane rich gas. The supernatant from the methane phase digester, containing nutrients for the acid forming microorganisms and added sewage sludge or other desired nutrient materials are circulated through the landfill. Low Btu gas is withdrawn from the acid phase digester while high Btu gas is withdrawn from the methane phase digester and may be upgraded for use as substitute natural gas (SNG).

The Fenstermaker Patent discloses an engine performance operating on field gas as engine fuel. The natural gas is improved for use as an engine fuel gas stream by treating with a permeable membrane through which hydrogen sulfide and heavier hydrocarbons permeate preferentially. The reject gas is returned to the natural gas pipeline. The upgraded gas is used for engine fuel to operate the pipeline compressor.

The Zison Patent discloses a landfill gas recovery system and method with pressure symmetry. It provides a collector's zone of influence, some type of equalizing means which intersects possible fissures and distributes the below-ambient pressure existing therein more or less evenly around the collection zone. The equalizing means take the form of one or more trenches filled with coarse aggregate so as to present elongated low-impedance gas paths within the active portion of the landfill immediately below the cover layer of the landfill. A low-impedance gas path which is a symmetry trench extends all the way around the collection zone at some distance therefrom but within the collector's zone of influence. The symmetry trench in effect bleeds off the low pressure from any fissures that it crosses and distributes that low pressure more or less evenly around the collection zone so as to give the zone of influence a reasonably uniform shape. The bleeding off of the low pressure in the fissures prevents dangerously low pressures from propagating outwardly from the symmetry trench beyond the confines of any protective gas barrier which may have been installed.

The Bresie Patent discloses a method and apparatus for producing natural gas from tight formations. It comprises natural gas wells in a tight formation area which are connected by piping. The piping is used as a reservoir to collect natural gas from the tight formation over a prolonged time period. Mobile pressure vessel units are employed periodically to recover the collected natural gas. Liquid/gas separators and dehydrator units are employed on the wells, so that the natural gas stored in the reservoir is ready for transport.

The Croskell Patent discloses a process for recovering gases from landfills. It comprises a central well or a plurality of peripheral wells in the landfill, where a mixture of methane and carbon dioxide is withdrawn from the central well of the landfill and the carbon dioxide and methane are separated. The methane is fed to a pipeline and a portion of the carbon dioxide is fed to wells spaced around the periphery of the landfill at a pressure of 7 to 170 kPa to prevent air from entering the landfill around the periphery.

The Jones Patent discloses a resource recovery utility. It comprises a landfill having a continuous wall surrounding the perimeter and a containment structure extending completely over the landfill affixed to the continuous wall. Refuse can be introduced into the landfill and compacted therein and at least a portion of the compacted refuse can be removed therefrom. Methane generated by anaerobic bacterial digestion of organic materials contained in the refuse can be removed and recovered.

The Schneider Patent discloses an apparatus and method for withdrawing gaseous decomposition products from a refuse dump. It comprises gas collection mechanisms, such as gas wells, drainage systems, etc., each of which is connected via a gas withdrawal line with a collector, from which the gas is withdrawn for further utilization. Disposed in each gas withdrawal line is a sensor and a regulatable shutoff device. The sensor transmits the content of a characteristic constituent of the gas flow in a given gas withdrawal line to a measuring and control unit, which monitors the gas flow volume as a function of a comparison of the sensor signals with preset threshold values.

The O'Brien Patent discloses a process for the separation of landfill gas. It comprises a recycle process for the separation of landfill gas containing a wide variety of impurities into a carbon dioxide product stream and a fuel-grade pressurized methane product stream. The process provides for the removal of both the impurities and the carbon dioxide in a cryogenic column as a bottom stream. The separation of the methane from the overhead product stream by a membrane process and the removal of impurities from the carbon dioxide bottom stream in a separate purification column are employed to recover a high-quality, liquid, carbon dioxide stream.

The Payne Patent discloses a method of removing and controlling volatile contaminates from the vadose layer of contaminated earth. It comprises a closed-loop device which includes one or more contaminant withdrawal wells surrounded by multiple air reinjection wells connected by a conduit. One or more pumps serve to draw volatilized contaminant through the withdrawal well to the connecting conduit where it is captured or neutralized. Residual air from the withdrawal well is urged back into the ground through the air reinjection wells to encourage further contaminant to move toward the withdrawal well for collection.

The Katz Patent discloses a landfill compaction system. It reduces the volume of landfill at an existing landfill site by essentially sealing off at least a portion of the landfill and utilizing a source of vacuum to extract gases from the sealed off portion of the landfill.

The Cummings Patent discloses a sludge/waste landfill method and system. It comprises a device for disposing waste in the landfill and a device for disposing sludge in the landfill with the waste. The system also includes a device for collecting gas produced within the landfill from the sludge mixed with the waste and a device for generating electrical energy from the collected gas. The generating means is in fluidics communication with the collecting means. The generating means includes an electrical generator which burns the gas to produce electricity.

None of these prior art patents have disclosed a process and apparatus for purification and compression of raw landfill gas to produce vehicle grade fuel. It is therefore highly desirable to have a very efficient and also very effective design and construction of a process and apparatus for purification and compression of raw landfill gas to produce vehicle grade fuel for vehicles.

SUMMARY OF THE INVENTION

The present invention is a process and apparatus for purification and compression of raw landfill gas in landfills to produce vehicle grade compressed gas for use in motor vehicles. The process is called Biomass Compressed Natural Gas (BCNG) production.

The objective is to sink new wells in the deepest and essentially most virgin parts of the landfill, to set the collection level deeper than normal and to pull very lightly on the new wells to limit air intrusion. It is believed that with this method, higher methane concentrations can be achieved in the gas removed.

The process and apparatus comprises a gas collection blower for extracting raw landfill gas. At the inlet to the gas collection blower there is a knockout drum which removes water droplets and particulates from the incoming landfill gas stream. This will produce condensate at this point which will be fed directly into a flare, which is commonly used to incinerate unused landfill gas. The knockout drum is to protect the blower from corrosion and erratic operation from moisture and solid buildup on the blower blades.

After the raw landfill gas is collected, all solids and significant moisture are removed in a pretreatment system prior to compression of the gas. The purpose of the pretreatment system is to protect a purification compression system through the elimination of particulates and the reduction in moisture. The purification compression system is used for purifying the dried raw landfill gas stream with no particulates.

The dried raw landfill gas stream is then compressed to enhance the function of the purification compression system. Additional moisture and oil residue from the compressor are removed. The gas stream is heated to maintain any remaining moisture in vapor form. Volatile organic compounds (VOC's) and the balance of the compressor oil are removed from the compressed raw landfill gas stream by passing it across an activated carbon guard bed system. The guard bed system is used to protect a multi-stage membrane system from moisture and heavy hydrocarbons including compressor lubrication oil.

An in-line heater heats waste gas to 400° F. which is used to drive off the collected VOC's from the guard bed system, thus regenerating them. The waste gas used for this task is the reconstituted permeate gas stream which has a very low methane content and is the waste product from this purification process. Subsequent to collecting the VOC's, the waste gas is sent to the flare.

The resultant gas stream from the guard bed system is fed to the multi-stage membrane system which separates the methane from the other constituents of the landfill gas including any remaining moisture. The resultant vehicle quality gas, comprised of at least 96% methane, is then compressed by a booster compressor to pressures acceptable for introduction and storage in motor vehicles converted to operate on compressed natural gas.

Described generally, the gas flow in the purification system and functions as follows. After removal of solids and significant moisture and after partial compression, the raw landfill gas enters the purification process. The raw landfill gas stream is slightly heated to keep any moisture remaining in the gas stream suspended in vapor form. A motorized valve allows the gas stream to flow to one of the two guard beds for the removal of VOC's. The other guard bed is being regenerated, a process which removes the accumulated VOC's and sends them to the flare for burning. The landfill gas stream without VOC's exits the guard bed and enters a first stage of the multi-stage membrane system. The residue gas stream which contains a much higher concentration of methane flows to a second stage of the multi-stage membrane system. The permeate gas stream from the first stage contains a low quantity of methane. This gas stream is heated in the in-line heater and sent to the regenerating guard bed to drive off the accumulated VOC's and send them to the flare. The accumulation and regeneration of the two guard beds is alternated. Out of the second stage of the multi-stage membrane system there is produced the 96+% pure methane which is vehicle quality. The permeate gas stream from the second stage has a relatively high methane content. This gas is used to fuel the engine driven compressor and to fuel the in-line heater. Any of the permeate gas from the second stage of the multi-stage membrane system not utilized is returned to the inlet gas stream.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a diagram showing the present invention apparatus for purification and compression of raw landfill gas stream in a landfill to produce vehicle fuel; and FIG. 2 is a flow chart block diagram illustrating the basic steps of the present invention process for purification and compression of raw landfill gas stream in a landfill to produce vehicle fuel.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown a general schematic diagram of an apparatus 10 of the present invention employed in a landfill 2. The apparatus 10 is used for the purification and compression of raw landfill gas stream 12 in the landfill to produce vehicle grade fuel for use in vehicles. The apparatus 10 comprises a pretreatment system 14 which includes a gas collection blower 16 for extracting the raw landfill gas stream 12 from the landfill 2, a knockout drum 18 and a drying device or means 20. The pretreatment system 14 is utilized to protect a purification compression system 24 through the elimination of particulates and the reduction in moisture.

The gas collection blower 16 is capable of producing approximately 1500 standard cubic feet per minute (SCFM) at a approximately 7 psia positive pressure at its outlet from twenty (20) inches vacuum at its inlet. The collection blower 16 pulls the gas stream 12 from the landfill 2. The knockout drum 18 is connected to the inlet of the collection blower 16 to remove water droplets and particulates from the incoming raw landfill gas stream 12. This will produce condensate at this point which will be directed into a flare 22 for burning. The knockout drum 18 protects the gas collection blower 16 from corrosion and erratic operation from moisture and solid buildup on the blower blades. The partially dry gas from the gas blower 16 enters a drying means 20 to further dry the partial dried raw landfill gas stream 19 with no particulates at a rate of approximately 1300 SCFM at approximately 5 psia.

After the raw landfill gas stream is extracted and collected, all solids and significant moisture are removed in the pretreatment system 14 prior to compression of the dried landfill gas stream 21. The purification compression system 24 removes additional moisture and compressor oil. The dried landfill gas stream 21 is heated to maintain any remaining moisture in vapor form. The purification compression system 24 includes an engine driven purification compressor 26 and a separation device or means 28. The compressor 26 compresses the dried landfill gas stream 21 at a rate of approximately 1300 SCFM at 1000 psia to facilitate the separation of oil and moisture. The compressor 26 requires a minimum of approximately 5 psia inlet pressure. For particulate removal, a basket strainer catches larger solids, but a more extensive filtering system may essentially be employed to eliminate solids. The separation device 28 separates the oil and the moisture from the compressed landfill gas stream 27. The compressed landfill gas stream 27 is then preheated by a means 40 which raises the gas stream to approximately 140° F. prior to entering an activated carbon guard bed system 32 to keep any moisture remaining in the gas stream suspended in vapor form. The VOC's and the balance of the oil residue from the purification compressor 26 are removed from the compressed landfill gas stream 27 by passing across the activated carbon guard bed system 32.

The guard bed system 32 includes two guard beds which are in parallel paths; one of the two guards will be absorbing and the other one will be regenerating. The guard bed system 32 allows for the regeneration of the guard beds by alternately sending hot gas through one of the guard beds and then the other one of the guard beds, rather than frequently replacing the activated carbon media. This regenerating cycle can be set to occur as frequently as required by the contamination which occurs. A motorized valve 30 allows the compressed landfill gas stream 27 to flow to one of the two guard beds 32 (only one is shown) for the removal of VOC's, while the other one is being regenerated, a process which removes the accumulated VOC's and sends them to the flare 22 for burning. The purpose of the guard bed system 32 is to guard a multi-stage membrane system 36 from moisture and heavy hydrocarbons including compressor lubrication oil and the VOC's from the raw landfill gas stream. Failure to guard against these substances will render the multi-stage membrane system 36 useless and possibly destroy it.

The landfill gas stream 37 without the VOC's exits the guard bed system 32 and enters a first stage 38 of the multi-stage membrane system 36. The treated residue gas stream 39, which contains a much higher concentration of methane, flows to a second stage 42 of the multi-stage membrane system 36. The permeate gas stream 41 from the first stage membrane 38 contains a low quantity of methane. This permeate gas stream 41 is heated by an in-line heater 34 and sent to the regenerating guard bed to drive off the accumulated VOC's and send them to the flare 22. The accumulation and regeneration of the two guard beds is alternated. Out of the second stage membrane 42 comes the 96+% pure methane 43 at a rate of approximately 483 SCFM at approximately 1000 psia which is vehicle quality. The permeate gas stream 45 from the second stage membrane 42 has a relatively high methane content. This gas stream 45 is used to fuel the purification compressor 26 and the in-line heater 34. Any of the second stage permeate gas not utilized is returned to the compressed inlet gas stream 29.

The in-line heater 34 heats the gas stream 41 to approximately 400° F. before the gas is run through the guard bed system 32 to drive of the collected VOC's. This heated gas 47 collects the undesirables and is piped to the flare 22. The gas to be used for this task is the reconstituted permeate gas 41 at a rate of approximately 584 SCFM which has a very low methane content and is the waste of this purification process. Raising the gas temperature to 400° F. can be accomplished by a heat exchange with the engine exhaust or by use of the in-line heater 34 burning permeate gas.

The resultant vehicle quality gas 43 is then compressed by a boost compressor 48 at a rate of approximately 483 SCFM at approximately 3600 psia to pressures acceptable for introduction and storage in motor vehicles converted to operate on compressed gas. A multiplicity of tube trailers 50 serve the dual purpose of transportation and site storage for a remote fueling system. The tube trailers 50 serve the purpose of output storage and transportation to other plants.

It will be appreciated that the apparatus 10 of the present invention may be employed with a computer system (not shown) to monitor and control the operation of the present invention. The computer system may also have a modem for remote monitoring.

Referring to FIG. 2, there is shown a block diagram of a process of the present invention for purification and compression of raw landfill gas stream in a landfill to produce vehicle grade fuel for use in vehicles. The process is comprised of eleven steps and they are as follows. The first step 52 is to extract and collect the raw landfill gas stream from the landfill. The second step 54 is to filter the solids and moisture from the raw landfill gas stream. The third step 56 is to partially dry the raw landfill gas stream at a rate of approximately 1500 SCFM at approximately 7 psia. The fourth step 58 is to further dry the raw landfill gas stream with no particulates at a rate of approximately 1300 SCFM at approximately 5 psia. The fifth step 60 is to compress the dried landfill gas stream to facilitate the separation of methane and other gas constituents. The sixth step 62 is to separate the oil and the moisture from the compressed landfill gas stream. The seventh step 64 is to pass the compressed landfill gas stream through one of the two activated carbon guard beds to remove VOC's, the other one is being regenerated which removes the accumulated VOC's and sends them to a flare for burning. The eighth step 66 is to filter the compressed landfill gas stream without the VOC's through a first stage of a multi-stage membrane system which produces a permeate gas containing a low quantity of methane, where the permeate gas is heated by an in-line heater and sent to the other one of the two activated carbon guard beds to drive off the accumulated VOC's and send them to the flare, and a residue gas which contains a much higher concentration of methane flows to a second stage of the multi-stage membrane system. The ninth step 68 is to filter the residue gas through the second stage of the multi-stage membrane system, leaving approximately a 96% to 98% pure methane from the other constituents and a permeate gas from the second stage which has a relatively high methane content is used for fueling the purification compressor and the in-line heater. Any of the permeate gas from the second stage not utilized is returned to the inlet gas stream. The tenth step 70 is to discharge the 96% to 98% pure methane from the second stage of the multi-stage membrane system. The eleventh step 72 is to compress the 96% to 98% pure methane at a rate of 483 SCFM at 3600 psia for introduction and storage in the vehicles converted to operate on compressed gas.

It will be appreciated that the quantities described above are merely one illustrative embodiment for a specific size landfill and can include many other comparable quantities. It is emphasized that the quantities will change with different sized landfills. Therefore, parameters which have been given throughout the text such as the compressor 26 compresses a dried landfill gas stream 21 at a rate of approximately 1300 SCFM at 1000 psia, the dry means 20 further dries the partial dried landfill gas stream 19 with no particulates at a rate of approximately 1300 SCFM and approximately 5 psia, and other specific numbered parameters, are merely illustrative of a specific landfill size and type and these parameters will change depending upon the size of landfill and the equipment used. However, the overall process technology which is the novelty of the present invention remains consistent regardless of the specific numbers as used.

Defined in detail, the present invention is a process for purification and compression of raw landfill gas stream in a landfill to produce vehicle grade fuel for use in vehicles, the process comprising the steps of: (a) extracting the raw landfill gas stream from the landfill with a gas collection blower; (b) providing a knockout drum to remove solids and moisture from the landfill gas stream from the gas collection blower; (c) partially drying the raw landfill gas stream and removing particulates; (d) further drying the raw landfill gas stream with the particulates removed; (e) compressing the dried landfill gas stream to facilitate the separation of methane from the other gas constituents; (f) separating oil and moisture from the compressed landfill gas stream; (g) providing at least two activated carbon guard beds; (h) passing the compressed landfill gas stream through one of the at least two activated carbon guard beds to remove volatile organic compounds (VOC's), the other one of the at least two activated carbon guard beds being regenerated which removes the accumulated VOC's and sends them to a flare for burning; (i) providing a multi-stage membrane system including a first stage and a second stage; (j) filtering the compressed landfill gas stream through the first stage of the multi-stage membrane system which produces a permeate gas containing a low quantity of methane, where the permeate gas is heated by an in-line heater and sent to the other one of the at least two activated carbon guard beds to drive off the accumulated VOC's and send them to the flare, and a residue gas which contains a much higher concentration of methane flows to the second stage of the multi-stage membrane system; (k) filtering the residue gas through the second stage of the multi-stage membrane system which produces approximately a 96% to 98% pure methane and a permeate gas from the second stage which has a relatively high methane content and used for fueling the compressing and the in-line heater, any of the permeate gas from the second stage not utilized is returned to the inlet gas stream; (l) discharging the 96% to 98% pure methane from the second stage of the multi-stage membrane for vehicle fuel; and (m) compressing the approximately 96% to 98% pure methane to pressures acceptable for introduction and storage in the vehicles converted to operate on compressed gas.

Defined broadly, the present invention is a process for purification and compression of a landfill gas stream to produce vehicle grade fuel for use in vehicles, the process comprising the steps of: (a) extracting the raw landfill gas stream from the landfill and removing particulates; (b) drying the raw landfill gas stream with the particulates removed; (c) providing a pretreatment system for pretreating the dried landfill gas stream; (d) providing at least two activated carbon guard beds; (e) passing the compressed landfill gas stream through one of the at least two activated carbon guard beds to remove volatile organic compounds (VOC's), the other one of the at least two activated carbon guard beds being regenerated which removes the accumulated VOC's and sends them to a flare for burning; (f) providing a multi-stage membrane system including a first stage and a second stage; (g) filtering the compressed landfill gas stream through the first stage of the multi-stage membrane system which produces a permeate gas containing a low quantity of methane, where the permeate gas is heated by an in-line heater and sent to the other one of the at least two activated carbon guard beds to drive off the accumulated VOC's and send them to the flare, and a residue gas which contains a much higher concentration of methane flows to the second stage of the multi-stage membrane system; (h) filtering the residue gas through the second stage of the multi-stage membrane system which produces approximately a 96% to 98% pure methane and a permeate gas from the second stage which has a relatively high methane content and used for fueling the compressing and the in-line heater, any of the permeate gas from the second stage not utilized is returned to the inlet gas stream; (i) discharging the 96% to 98% pure methane from the second stage of the multi-stage membrane for vehicle fuel; and (j) compressing the approximately 96% to 98% pure methane to pressures acceptable for introduction and storage in the vehicles converted to operate on compressed gas.

Defined more broadly, the present invention is a process for purification and compression of a landfill gas stream to produce vehicle grade fuel for use in vehicles, the process comprising the steps of: (a) extracting the landfill gas stream; (b) drying the extracted landfill gas stream; (c) providing a pretreatment system for pretreating the dried landfill gas stream; (d) providing at least one guard bed; (e) passing the pretreated landfill gas stream through the at least one guard bed to eliminate additional impurities; (f) providing a membrane system; and (g) filtering the pretreated landfill gas stream through the membrane system to purify the pretreated landfill gas stream to a level of approximately at least 96% pure methane which is vehicle quality.

Alternatively defined in detail, the present invention is an apparatus used in conjunction with a landfill for purification and compression of a raw landfill gas stream to produce vehicle grade fuel for use in vehicles, the apparatus comprising: (a) a gas collection blower for extracting and partially drying the raw landfill gas stream; (b) a knockout drum connected to the gas collection blower for removing solids, particulates and moisture from the extracted raw landfill gas stream; (c) means for further drying the extracted raw landfill gas stream with no particulates; (d) a first compressor for compressing the dried landfill gas stream to facilitate the separation of methane from the other gas constituents; (e) means for separating oil and moisture from the compressed landfill gas stream; (f) at least two guard beds; (g) a motorized valve connected to the at least two guard beds for allowing the compressed landfill gas stream to flow to one of the at least two guard beds for removing volatile organic compounds (VOC's), the other one of the at least two guard beds being regenerated which removes the accumulated VOC's and sends them to a flare for burning; (h) a multi-stage membrane system including a first stage and a second stage, the first stage for filtering the compressed landfill gas stream which produces a permeate gas containing a low quantity of methane, where the permeate gas is heated by an in-line heater and sent to the other one of the at least two activated carbon guard beds to drive off the accumulated VOC's and send them to the flare, and a residue gas which contains a much higher concentration of methane flows to the second stage for filtering the residue gas which produces approximately a 96% to 98% pure methane and a permeate gas from the second stage which has a relatively high methane content and used for fueling the compressing and the in-line heater, any of the permeate gas from the second stage not utilized is returned to the inlet gas stream; and (i) a boost compressor for compressing the approximately 96% to 98% pure methane to pressures acceptable for introduction and storage in the vehicles converted to operate on compressed gas.

Alternatively defined broadly, the present invention is an apparatus used in conjunction with a landfill for purification and compression of a landfill gas stream to produce vehicle grade fuel for use in vehicles, the apparatus comprising: (a) means for extracting the landfill gas stream; (b) means for removing solids and moisture from the extracted landfill gas stream; (c) a pretreatment system for pretreating the extracted landfill gas stream; (d) a guard bed for removing volatile organic compounds (VOC's) from the pretreated landfill gas stream; and (e) a membrane system for filtering the pretreated landfill gas stream without the VOC's which produces approximately a 96% pure methane.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A process for purification and compression of raw landfill gas stream in a landfill to produce vehicle grade fuel for use in vehicles, the process comprising the steps of:

a. extracting said raw landfill gas stream from said landfill with a gas collection blower;

b. providing a knockout drum to remove solids and moisture from said landfill gas stream from said gas collection blower;

c. partially drying said raw landfill gas stream and removing particulates;

d. further drying said raw landfill gas stream with the particulates removed;

e. compressing said dried landfill gas stream to facilitate the separation of methane from the other gas constituents;

f. separating oil and moisture from said compressed landfill gas stream;

g. providing at least two activated carbon guard beds;

h. passing said compressed landfill gas stream through one of said at least two activated carbon guard beds to remove volatile organic compounds VOC's, the other one of said at least two activated carbon guard beds being regenerated which removes the accumulated VOC's and sends them to a flare for burning;

i. providing a multi-stage membrane system including a first stage and a second stage;

j. filtering said compressed landfill gas stream through said first stage of said multi-stage membrane system which produces a permeate gas containing a low quantity of methane, where the permeate gas is heated by an in-line heater and sent to the other one of said at least two activated carbon guard beds to drive off the accumulated VOC's and send them to said flare, and a residue gas which contains a much higher concentration of methane flows to said second stage of said multi-stage membrane system;

k. filtering said residue gas through said second stage of said multi-stage membrane system which produces approximately a 96% to 98% pure methane and a permeate gas from said second stage which has a relatively high methane content and used for fueling said compressing and said in-line heater, any of the permeate gas from said second stage not utilized is returned to the inlet gas stream;

l. discharging said 96% to 98% pure methane from said second stage of said multi-stage membrane for vehicle fuel; and m. compressing said approximately 96% to 98% pure methane to pressures acceptable for introduction and storage in the vehicles converted to operate on compressed gas.

2. A process for purification and compression of a landfill gas stream to produce vehicle grade fuel for use in vehicles, the process comprising the steps of:

a. extracting said raw landfill gas stream from said landfill and removing particulates;

b. drying said raw landfill gas stream with the particulates removed;

c. providing a pretreatment system for pretreating said dried landfill gas stream;

d. providing at least two activated carbon guard beds;

e. passing said compressed landfill gas stream through one of said at least two activated carbon guard beds to remove volatile organic compounds VOC's, the other one of said at least two activated carbon guard beds being regenerated which removes the accumulated VOC's and sends them to a flare for burning;

f. providing a multi-stage membrane system including a first stage and a second stage;

g. filtering said compressed landfill gas stream through said first stage of said multi-stage membrane system which produces a permeate gas containing a low quantity of methane, where the permeate gas is heated by an in-line heater and sent to the other one of said at least two activated carbon guard beds to drive off the accumulated VOC's and send them to said flare, and a residue gas which contains a much higher concentration of methane flows to said second stage of said multi-stage membrane system;

h. filtering said residue gas through said second stage of said multi-stage membrane system which produces approximately a 96% to 98% pure methane and a permeate gas from said second stage which has a relatively high methane content and used for fueling said compressing and said in-line heater, any of the permeate gas from said second stage not utilized is returned to the inlet gas stream;

i. discharging said 96% to 98% pure methane from said second stage of said multi-stage membrane for vehicle fuel; and j. compressing said approximately 96% to 98% pure methane to pressures acceptable for introduction and storage in the vehicles converted to operate on compressed gas.

3. The process in accordance with claim 2 further comprising the step of providing a knockout drum to remove solids and moisture from said extracted landfill gas stream.

4. The process in accordance with claim 2 wherein said pretreatment system further comprises the steps of:

a. compressing said dried landfill gas stream to facilitate the separation of methane from the other gas constituents; and b. separating and eliminating oil and moisture from said compressed landfill gas stream.

5. A process for purification and compression of a landfill gas stream to produce vehicle grade fuel for use in vehicles, the process comprising the steps of:

a. extracting said landfill gas stream;

b. drying said extracted landfill gas stream;

c. providing a pretreatment system for pretreating said dried landfill gas stream;

d. providing at least one guard bed;

e. passing said pretreated landfill gas stream through said at least one guard bed to eliminate additional impurities;

f. providing a membrane system;

g. filtering said pretreated landfill gas stream through said membrane system to purify said pretreated landfill gas stream to a level of approximately at least 96% pure methane which is vehicle quality; and h. compressing said at least 96% pure methane to pressures acceptable for introduction and storage in the vehicles converted to operate on compressed gas.

6. The process in accordance with claim 5 further comprising the step of providing a knockout drum to remove solids and moisture from said extracted landfill gas stream.

7. The process in accordance with claim 5 wherein said pretreatment system further comprises the steps of:

a. compressing said dried landfill gas stream to facilitate the separation of methane from the other constituents; and b. separating and eliminating oil and moisture from said compressed landfill gas stream.

8. The process in accordance with claim 5 further comprising the step of discharging said at least 96% pure methane from said membrane system for vehicle fuel.

9. An apparatus used in conjunction with a landfill for purification and compression of a raw landfill gas stream to produce vehicle grade fuel for use in vehicles, the apparatus comprising:

a. a gas collection blower for extracting and partially drying said raw landfill gas stream;
  b. a knockout drum connected to said gas collection blower for removing solids, particulates and moisture from said extracted raw landfill gas stream;
  c. means for further drying said extracted raw landfill gas stream with the particulates removed;
  d. a first compressor for compressing said dried landfill gas stream to facilitate the separation of methane from the other gas constituents;
  e. means for separating oil and moisture from said compressed landfill gas stream;
  f. at least two guard beds;
  g. a motorized valve connected to said at least two guard beds for allowing said compressed landfill gas stream to flow to one of said at least two guard beds for removing volatile organic compounds VOC's, the other one of said at least two guard beds being regenerated which removes the accumulated VOC's and sends them to a flare for burning;
  h. a multi-stage membrane system including a first stage and a second stage, the first stage for filtering said compressed landfill gas stream which produces a permeate gas containing a low quantity of methane, where the permeate gas is heated by an in-line heater and sent to the other one of said at least two activated carbon guard beds to drive off the accumulated VOC's and send them to said flare, and a residue gas which contains a much higher concentration of methane flows to the second stage for filtering the residue gas which produces approximately a 96% to 98% pure methane and a permeate gas from the second stage which has a relatively high methane content and used for fueling said compressing and said in-line heater, any of the permeate gas from the second stage not utilized is returned to the inlet gas stream; and
  i. a boost compressor for compressing said approximately 96% to 98% pure methane to pressures acceptable for introduction and storage in the vehicles converted to operate on compressed gas.

10. An apparatus used in conjunction with a landfill for purification and compression of a landfill gas stream to produce vehicle grade fuel for use in vehicles, the apparatus comprising:

a. means for extracting said landfill gas stream;
  b. means for removing solids and moisture from said extracted landfill gas stream;
  c. a pretreatment system for pretreating said extracted landfill gas stream;
  d. a guard bed for removing volatile organic compounds VOC's from said pretreated landfill gas stream;
  e. a membrane system for filtering said pretreated landfill gas stream without the VOC's which produces approximately a 96% pure methane: and
  f. a boost compressor for compressing said approximately 96% pure methane to pressures acceptable for introduction and storage in the vehicles converted to operate on compressed gas.

11. The apparatus in accordance with claim 10 wherein said means for extracting said landfill gas stream comprises a gas collection blower.

12. The apparatus in accordance with claim 11 wherein said means for removing solids and moisture from said extracted landfill gas stream comprises a knockout drum connected to said gas collection blower.

13. The apparatus in accordance with claim 10 wherein said pretreatment system further comprises a drying device for drying said extracted landfill gas, a compressor for compressing said dried landfill gas stream to facilitate the separation of methane from the other gas constituents and a separation device for separating oil and moisture from said compressed landfill gas stream.

* * * * *